Figure 1:
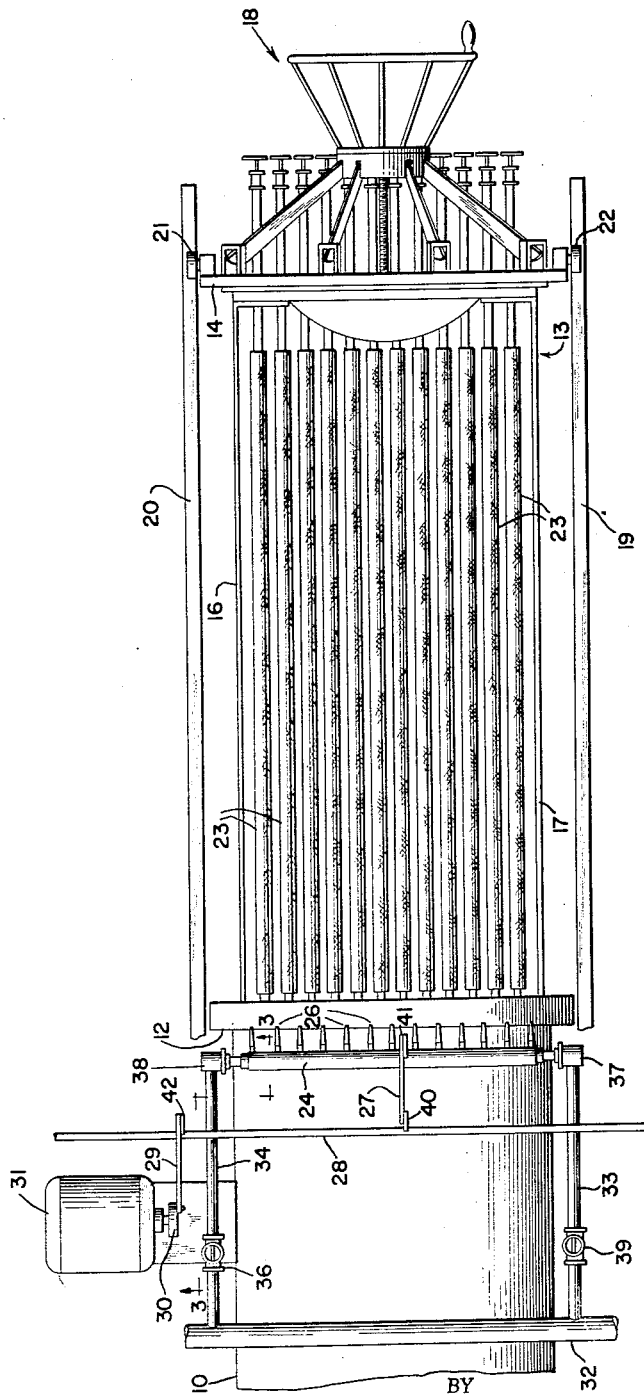

Jan. 19, 1960  M. A. JOHNSON ET AL  2,921,685
WASHING APPARATUS

Filed Nov. 14, 1956  2 Sheets-Sheet 2

INVENTOR
MARTIN A. JOHNSON
JOHN W. HOLEMAN

BY James E. Toomey
ATTORNEY

United States Patent Office 2,921,685
Patented Jan. 19, 1960

2,921,685

WASHING APPARATUS

Martin A. Johnson, Baton Rouge, La., and John W. Holeman, Oakland, Calif., assignors to Kaiser Aluminum & Chemical Corporation, Oakland, Calif., a corporation of Delaware Application November 14, 1956, Serial No. 622,030

3 Claims. (Cl. 210—236)

This invention relates to a filtering apparatus and more particularly to a device for removing the filter cake from the filter medium.

In filtering operations where a solids containing slurry to be filtered is passed through a filtering apparatus, the filter medium becomes coated with the solids from the slurry. The solids form on the filter medium as a cake. There are various devices in the prior art for removing this filter cake from the filter medium, but most of the methods and devices involve the removal of the filter cake within the filtering apparatus. It has also been the practice to remove the filter medium from the body of the filtering apparatus and to manually hose down the cake from the filter medium.

Many of the prior art devices have mechanical cleaning devices with wash nozzles located inside of the filtering apparatus shell. These devices for removing the filter cake, located within the filtering apparatus are disadvantageous since the cake removal mechanism, and nozzles, are submerged in the slurry during the filtering operation. Considerable maintenance is required to keep the filter cake removal mechanism in operable condition. Furthermore, the condition of the filter medium cannot be observed during the washing period.

If the wash liquid supply valve is not closed properly, excess dilution enters into the filtrate liquids and cannot be detected unless the filtrate liquid is analyzed or at the completion of the filtration cycle the apparatus is opened up for inspection.

Furthermore, the operation of the mechanical washer cannot be observed during the washing period. If the nozzles are plugged on the mechanical cake removal device, this condition cannot be detected until the filtering appartus head is removed. Furthermore, if the filter cake is not properly removed from the filter medium during the washing period it would not be detected until the apparatus is opened up for inspection.

It is therefore an object of this invention to produce a filter cleaning device which is independent of and disposed exteriorly of the filtering vessel.

It is another object to produce an automatic filter cleaning device capable of oscillatory movement during the washing operation which will scan the entire filter surface of the filtering medium.

It is a further object to produce a filter cleaning device disposed in close proximity to the filtering vessel wherein the filter cleaning operation is clearly visible and which can be manufactured with minimum expense and time.

It is a further object to produce a washing device which will remove the filter cake, free from contact with slurry in the filtering apparatus and such that the slurry in the apparatus cannot plug or form scale in the nozzles and mechanism of the washing device.

It is another object to produce a mechanism for cleaning a filter medium which requires very little maintenance to keep in operable condition and also such that the filter medium can be observed during the washing period.

Furthermore, it is another object to produce a washing device such that its operation can be observed during the washing period, to detect nozzles which are plugged, and to easily observe if the solids are properly removed from the filter medium during the washing period.

It is another object of this invention to produce a device which will automatically wash and remove solid materials from a filter medium with hot or cold solutions and to accomplish a major reduction of labor costs and materials.

The present invention provides the combination of a filter apparatus containing filter members, and a washing device for washing the filter members of said filter apparatus, and comprises multiple nozzle means disposed exteriorly of said filter apparatus with means to operate the nozzle means in an oscillatory manner through a predetermined arc, means to supply washing fluid to the nozzles, and means to remove the filter members from the filter apparatus in order to position them for the washing operation.

Figure 2:
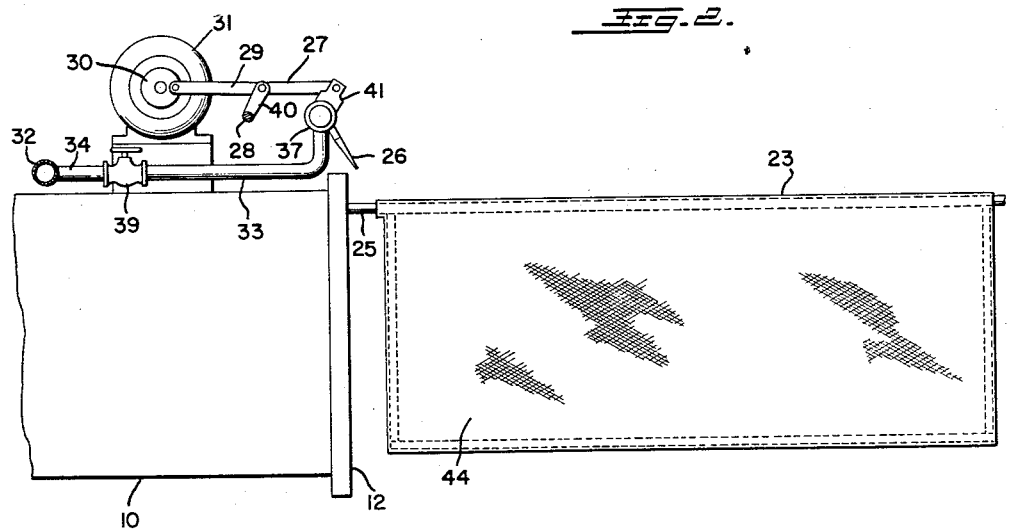
Figure 3:
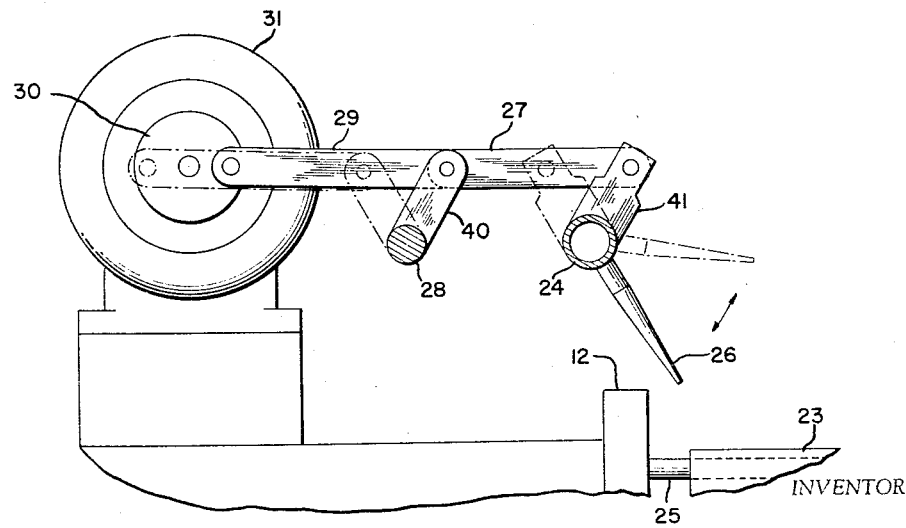

A complete understanding will be manifest from a reading of the following specification taken in conjunction with the following drawings, which latter are not intended to limit the invention, but to provide a detailed description of a complete specific embodiment thereof. In the accompanying drawings, like numerals are employed to designate like parts throughout the same:

Figure 1 is a top view of a filtering apparatus having disposed in proximity therewith a filter medium washing device, Figure 2 is a side view of the same apparatus as in Figure 1 showing in more detail the washing device and the position of a filter medium during the washing operation, and Figure 3 is a sectional view along line 3—3 in Figure 1 showing in more detail the washing device of the invention.

Referring now to the drawings, Figure 1 is a top view of a filtering apparatus of the pressure type consisting primarily of a cylindrical tank which encloses a number of rectangular filter leaves. This is known in the art as a Kelly press filter. More particularly, 10 is the filter press shell, 12 is the filter press head attached to the shell which engages detachable member 14 which is part of a carriage 13 which supports filter leaves 23. The carriage 13 moves in and out of the shell 10 by means of wheels or rollers 21 and 22 engaging the track surfaces 19 and 20. The carriage 13 comprises as a complete unit, frame members 16 and 17 which are attached to member 14 which has wheels or rollers 21 and 22 attached thereto.

When the carriage 13 is completely within the filter press shell 10, the locking mechanism shown generally at 18 locks the filter press head 12 tightly against member 14 of the filter carriage 13. The leaves 23 are generally rectangular and hang vertically in the carriage 13. Each filter leaf 23 comprises a frame member 25 which is enclosed in a bag of filter cloth 44. The carriage 13 is shown in its withdrawn position in the figures.

The washing device is mounted atop the filter press shell 10 and comprises a washing liquid distributing header 24 which contains a plurality of spray nozzles 26 mounted in spaced relationship to each other. Conduits 33 and 34 supply washing liquid to the distributing header 24 and have valves 35 and 36 to regulate the amount of washing liquid flowing through the conduits. Another header 32 supplies washing liquid to conduits 33 and 34 as well as to other similar washing devices on other filter presses. The distributing header 24 is connected to conduits 33 and 34 by means of ball bearing pressure tight swivel joints 37 and 38 which permit pivotal movement of the distributing header.

The distributing header 24 operates in a pivotal oscillatory movement and is actuated by a motor 31 through an eccentric connection on disc 30. The eccentric disc 30 moves a train of connecting members 29, 28, and 27 to supply the oscillatory movement to the distributing header 24. The shaft 28 may extend from one filter press to another such that motor 31 may operate a bank of filter press washing devices. The connecting rod 27 is pivotally mounted to lever arms 40 and 41. The connecting rod 29 is pivotally connected to eccentric disc 30 and lever arm 42. The lever arms 40 and 42 are rigidly mounted to shaft 28. The lever arm 41 is rigidly mounted to distributing header 24. The spray nozzles 26 are positioned on distributing header 24 in spaced relationship. Each nozzle 26 is arranged on the header so that the stream issuing from the nozzle is directed between adjacent filter leaves 23, and being divergent impinges on the filter cake deposited on opposing faces of adjacent filter leaves. In other words the spray with proper spread will wash the filter cake from the two opposing vertical surfaces of adjoining filter leaves. The oscillating motion applied to distributing header 24 causes the nozzles to move through an arc great enough that the fluid issuing from the nozzles, sprays the entire surfaces of the filter leaves from one end to the other. The rotation angle of the distributing header 24 and nozzles 26 is determined by the size of the filter press leaf 23. This rotation angle may be varied by moving the eccentric connection of connecting rod 29 on eccentric disc 30. Thus, to increase the rotation angle, the connection is moved away from the center of the disc and to decrease the rotation angle the connection is moved closer to the center of the disc.

The washing operation takes place after the filter press has been in operation for a period of time sufficient to build a cake of solids on the surfaces of filter leaves 23. When this stage of the filtering operation has taken place, the filtering operation is discontinued and the carriage 13 containing the filter leaves is removed from the filter press shell by releasing the lock mechanism 18 and drawing the carriage out of the filter press shell on wheels or rollers 21 and 22 along runners 19 and 20. When the carriage is drawn from the filter press shell, the motor 31 is operated causing connecting rod 29 to actuate shaft 28 which in turn actuates connecting rod 27 which gives an oscillatory movement to distributing header 24 through lever arm 41. The nozzles 26 thus travel in an oscillatory movement through a predetermined arc causing the washing liquid to spray over the surfaces of the filter leaves. The washing liquid is supplied through washing liquid supply header 32 passing through conduits 33 and 34 to the wash liquid distributing header 24. The washing operation is continued until the filter cake is completely washed from the filter leaves. When the cleaning operation is completed, the frame is then moved back into the filter press shell, locked, and the filter press is again ready for another filtration operation.

Other advantages are obtained from our invention in that since the device is mounted outside of the filter press vessel, it does not obstruct the method of changing the filter press leaves when this is necessary. Furthermore, the main force of the liquid from the nozzles is directly between and against the sides of the filter cloth 44. If the main force of the liquid from the nozzles were directed on top of the filter press leaves, it would destroy the leaf cloth cover. The nozzle installation is governed by the number of filter press leaves per filter press. For example, a filter press containing 11 leaves requires 12 nozzles. By using this limited number of nozzles, the size opening on the nozzles can be increased which aids in preventing plugging. It also concentrates the force and volume of liquid for filter cake removal where it is most effective, the nozzles being so arranged that they direct the flow of wash liquid between the filter press leaves with the proper spread so as to accomplish an efficient removal of solids from the filter press leaves.

This mechanical filter cake removal device is especially designed for use on filter presses used in the production of alumina. It is important for this device to be mounted outside of the presses due to the severe scaling characteristics of liquids and materials fed to filter presses in alumina production. The filter cake at times is most difficult to remove from the press leaves due to the sticky characteristics of the filter cake. If the mechanical filter cake removal device were located inside of the filter press shell, one could not determine when the complete removal of the filter cake is accomplished. It would also scale up and become inoperable in a short period of time. The mechanical filter press leaf washer is a complete separate unit and does not interfere with the filter press operation and does not come in contact with the slurry inside of the press shell. For this reason, it is practically free from scaling and plugging up.

Another decided advantage flowing from our novel device is that on devices located within the filter press shell, it is necessary to have packing glands to prevent slurry liquid from leaking from the filter press when the press is under pressure. In our device no packing glands are required to prevent the slurry liquid from leaking from the filter press.

The particular application of the washing device of the present invention to alumina production is a decided advantage over methods where manually operated hoses with a water pressure of approximately 220 to 225 lbs. per square inch are used to wash materials off the filter press leaf covers. It would be desirable to use a hot caustic soda solution to wash materials off the filter press cloths. There would be a sizeable reduction in raw material lost if hot caustic soda solution could be used for washing mud and materials off of filter press leaves but because of the temperature and chemical nature of the solution, it would be a safety hazard and impractical to manually operate hoses to wash material off of filter press leaf covers. With the device of this invention, it is possible to use caustic solution for the washing operation.

The device also eliminates the human error involved in washing press leaf covers. Frequently the operators are not cautious and considerable amounts of solid materials are not washed off of press leaf covers and when the filter presses are put back into service on hot solution this material is baked on into the cloth and reduces the filtration rate which causes an increase in filter cloth usage.

It is to be understood that the form of our invention herewith shown and described is to be taken as a preferred example of the same and that various changes in the shape, size and arrangement of parts may be resorted to without departing from the spirit of our invention or the scope of the appended claims. Having thus described our invention, we claim:

1. The combination of a filter leaf washing device with a filter apparatus, said filter apparatus comprising an enclosure containing a plurality of vertically disposed filter leaves, means for removing said filter leaves from one end of said enclosure, said washing device disposed exteriorly and in proximity to the leaf removal end of said enclosure and comprising a series of nozzles disposed horizontally along an oscillatable washing fluid distributing header, means for supplying washing fluid to said header, means for oscillating said header through a predetermined arc including a power driven eccentric, whereby vertical arcuate oscillating motion may be supplied to said nozzles and whereby washing fluid issuing from each intermediate nozzle will spray the entire opposing vertical surfaces of two adjacent filter leaves in their removed position.

2. The combination of a filter leaf washing device with a pressure type filter apparatus, said filter apparatus comprising a pressure tight shell containing a plurality of filter leaves vertically disposed parallel to the longitudinal axis of said shell, means for removing said filter leaves from one end of said shell along its longitudinal axis, said washing device disposed exteriorly and in proximity to the leaf removal end of said shell and comprising a series of nozzles disposed horizontally along an oscillatable washing fluid distributing header, means for supplying washing fluid to said header through pressure tight swivel joints, means for oscillating said header through a predetermined arc including a power driven eccentric, lever arms and connecting rods, whereby vertical arcuate oscillating motion may be supplied to said nozzles and whereby washing fluid issuing from each intermediate nozzle will spray the the entire opposing vertical surfaces of two adjacent filter leaves in their removed position.

3. The apparatus of claim 2 wherein said arc is determined by the size of said filter leaves.

References Cited in the file of this patent

UNITED STATES PATENTS

| | | |
|---|---|---|
| 864,308 | Kelly | Aug. 27, 1907 |
| 1,144,854 | Lass | June 29, 1915 |
| 1,510,568 | Sweetland | Oct. 7, 1924 |

FOREIGN PATENTS

| | | |
|---|---|---|
| 266,997 | Germany | Nov. 4, 1913 |

UNITED STATES PATENT OFFICE
CERTIFICATE OF CORRECTION

Patent No. 2,921,685                      January 19, 1960

Martin A. Johnson et al.

It is hereby certified that error appears in the printed specification of the above numbered patent requiring correction and that the said Letters Patent should read as corrected below.

Column 3, line 63, for "It" read -- If --; column 5, line 13, strike out "the", second occurrence.

Signed and sealed this 4th day of October 1960.

(SEAL)

Attest:
KARL H. AXLINE
Attesting Officer

ROBERT C. WATSON
Commissioner of Patents